4 Sheets—Sheet 1.

J. J. CURRAN,

Assignor, by mesne assignments, to himself and C. WILCOX.

Lumber-Drier.

No. 8,846. Reissued Aug. 12, 1879.

WITNESSES

Emil H. Drommann

F. A. Merrell

INVENTOR

John J. Curran

Per W. E. Dayton

Attorney

4 Sheets—Sheet 2.

J. J. CURRAN,

Assignor, by mesne assignments, to himself and C. WILCOX.

Lumber-Drier.

No. 8,846. Reissued Aug. 12, 1879.

WITNESSES
Emil H. Frommann
F. A. Merrill

INVENTOR
John J. Curran
per Ill. E. Dayton
Attorney

4 Sheets—Sheet 3.

J. J. CURRAN,

Assignor, by mesne assignments, to himself and C. WILCOX.

Lumber-Drier.

No. 8,846. ~~Reissued~~ Aug. 12, 1879.

WITNESSES

Emil H. Frommann

F. A. Merrill

INVENTOR

John J. Curran per Ch. E. Dexter

Attorney.

J. J. CURRAN,

Assignor, by mesne assignments, to himself and C. WILCOX.

Lumber-Drier.

No. 8,846. Reissued Aug. 12, 1879.

WITNESSES

Emil H. Frommann

F. A. Merrill

INVENTOR

John J. Curran per W. E. Dayton

Attorney

UNITED STATES PATENT OFFICE.

JOHN J. CURRAN, OF CHICAGO, ILLINOIS, ASSIGNOR, BY MESNE ASSIGNMENTS, TO HIMSELF AND CARLOS WILCOX.

IMPROVEMENT IN LUMBER-DRIERS.

Specification forming part of Letters Patent No. 161,490, dated March 30, 1875; Reissue No. 8,846, dated August 12, 1879; application filed July 2, 1879.

*To all whom it may concern:*

Be it known that I, JOHN J. CURRAN, of Chicago, in the county of Cook and State of Illinois, have invented certain new and useful Improvements in Lumber-Driers; and do hereby declare that the following is a full, clear, and exact description thereof, reference being had to the accompanying drawings, and to the letters of reference marked thereon, making a part of this specification.

The nature of my invention consists in the construction and arrangement of a kiln for drying lumber, as will be hereinafter more fully set forth.

In order to enable others skilled in the art to which my invention appertains to make and use the same, I will now proceed to describe its construction and operation, referring to the annexed drawings, in which—

Figure 1:
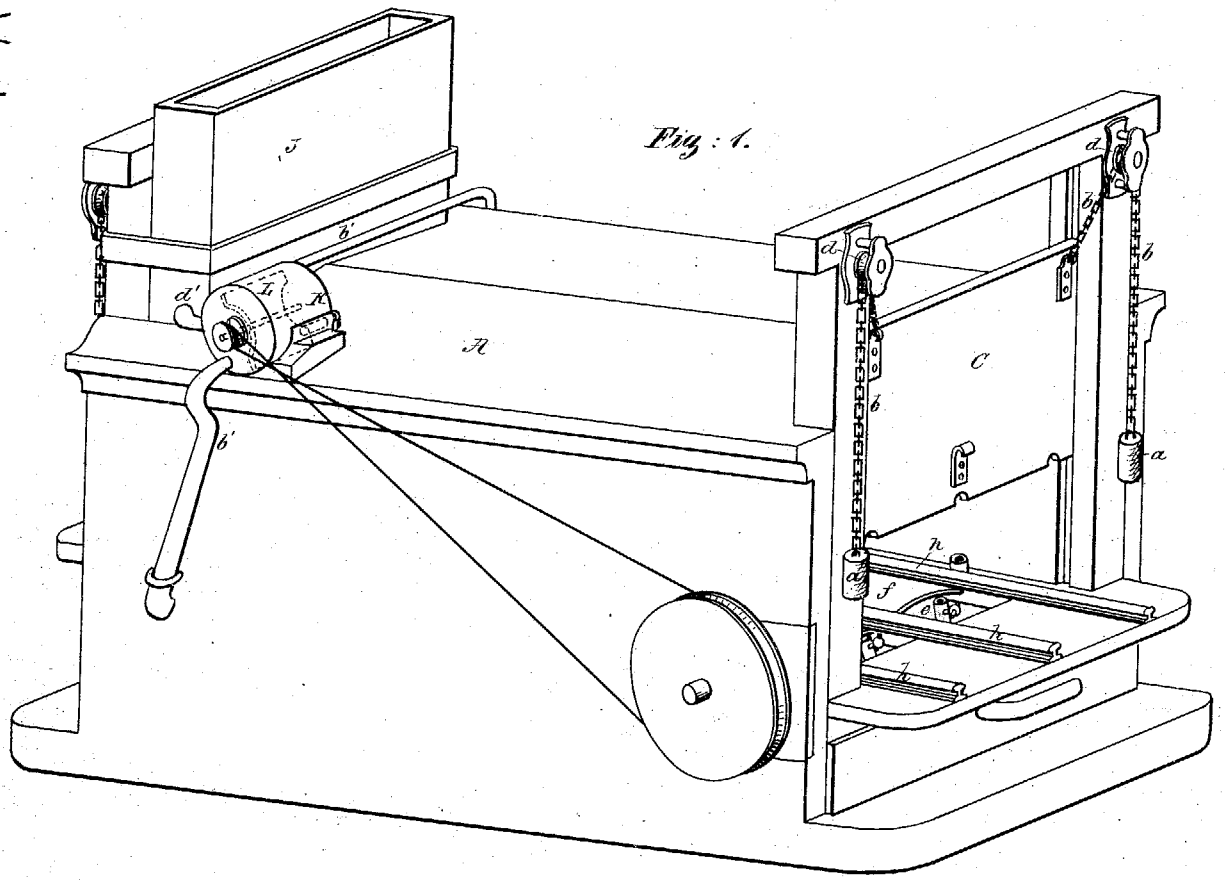
Figure 2:
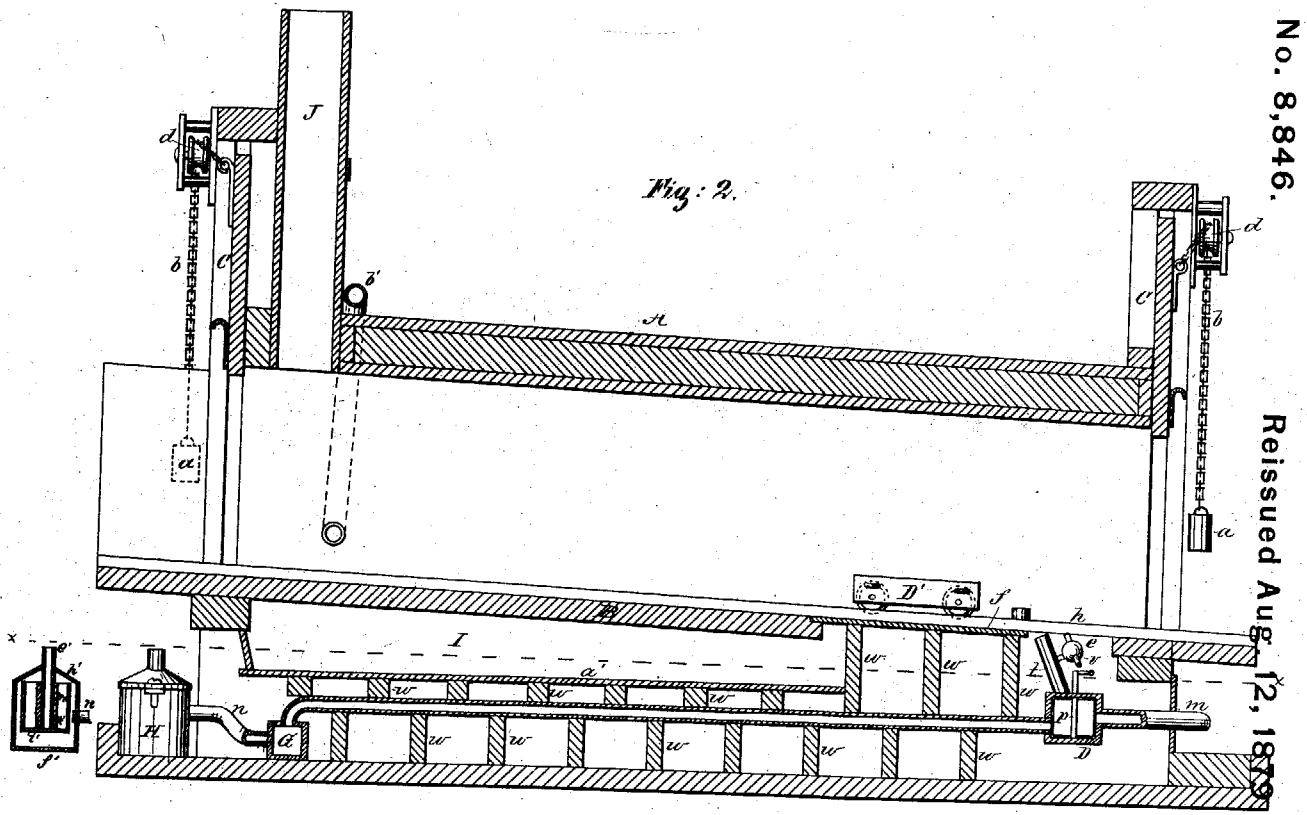
Figure 3:
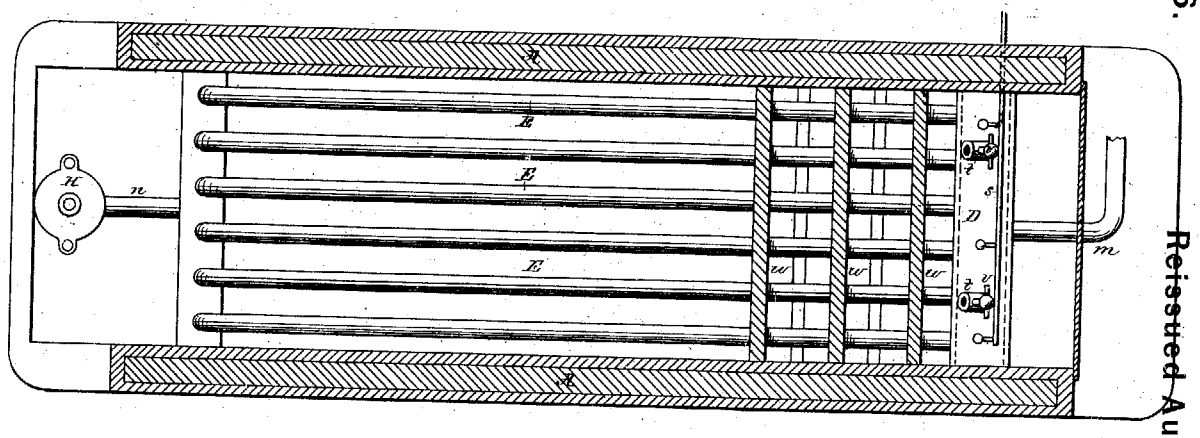
Figure 4:
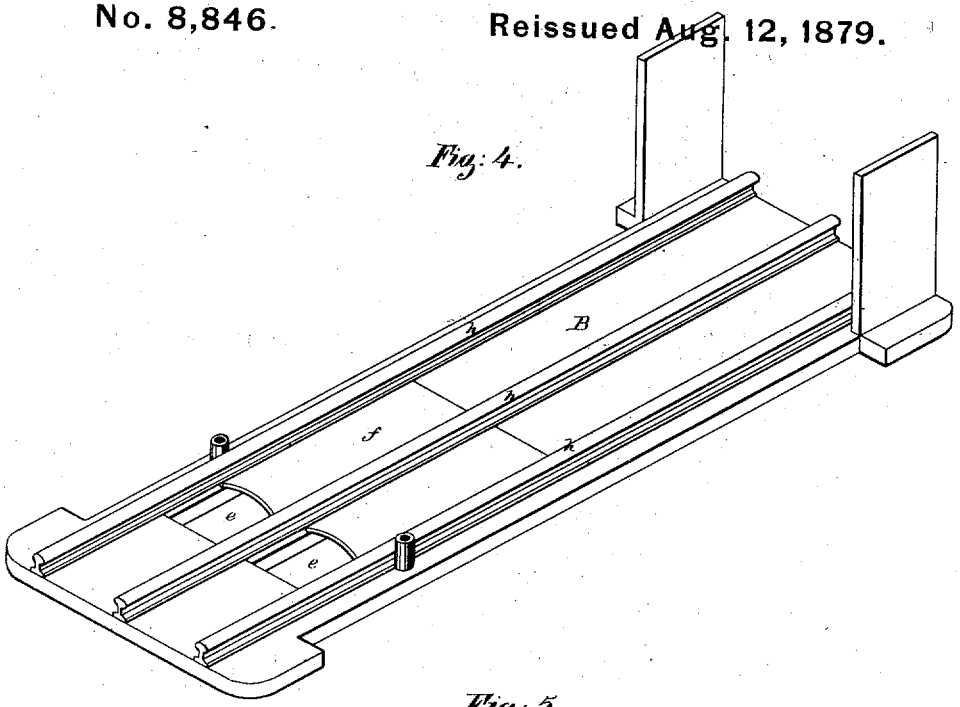
Figure 5:
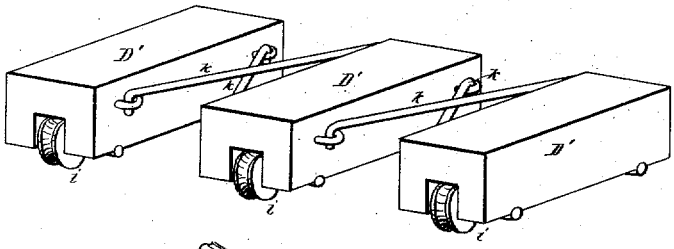
Figure 6:
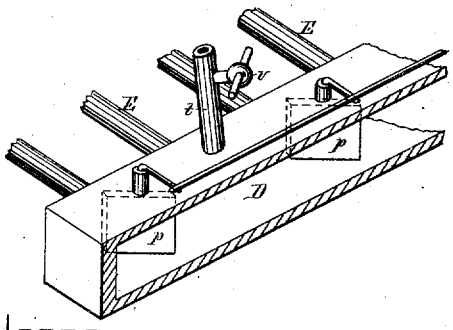

Figure 1 is a perspective view of my improved lumber-drier. Fig. 2 is a longitudinal vertical section of the same. Fig. 3 is a horizontal section through the line *x x* of Fig. 2. Fig. 4 is a perspective view of the bottom of the kiln. Fig. 5 is a perspective view of one of the cars used therein, and Fig. 6 is a perspective view of the steam-chamber used in the kiln.

A represents the shell of the kiln, constructed in any suitable manner, and divided, by means of an inclined floor, B, into the drying-chamber above and the heating-chamber below. The drying-chamber above the inclined floor B is closed at both ends by means of vertically-sliding doors C C, balanced by means of weights *a a*, connected by chains *b b* to the doors, and said chains passing over elevated pulleys *d d*, as shown.

The inclined floor B extends beyond both ends of the kiln, and forms platforms upon which the cars are loaded and unloaded. In the lower portion of the floor B, near the rear end of the kiln, are apertures *e*, for the passage of the heated air from the heating-chamber below to the drying-chamber above the floor. Back of these openings the floor is made of sheet-iron for a suitable distance, against the under side of which the heated air strikes, so as to heat above the same by radiation also.

Longitudinally on the top of the floor are secured three parallel rails, *h*, forming the track upon which the cars run. Each car is composed of three beams, D′, made entirely independent of each other, and each provided near each end with a flanged wheel, *i*, to run on the rails.

The beams D′ D′ are, in use, connected together by means of hooks *k k*, crossing each other, as shown in Fig. 5, forming a flexible self-adjusting car, which can easily be taken apart, so that one man can carry it in section from one end of the kiln to the other; whereas, with the cars now generally in use, it takes three or four men to convey the car back to the entrance.

Below the openings *e* in the heating-chamber is placed a steam-chamber, D, into which steam is admitted from a boiler or engine through the pipe *m*. The exhaust-steam from the engine used in the mill with which the drier is connected may be employed, if desired.

From the steam-chamber D a series of pipes, E, lead into another steam-chamber, G, at the rear end of the kiln, and from this latter chamber a pipe, *n*, conveys the steam into a steam-trap, H.

The chambers D and G may be of any suitable form; but I prefer to make them rectangular, as shown.

In the chamber D are valves or dampers *p p*, operated by means of a rod, *s*, for the purpose of deflecting the steam, and causing it to pass as near equally as possible through the pipes E. From the chamber D extend one or more short pipes, *t*, into the openings *e* in the inclined bottom B, each pipe being provided with a stop-cock, *v*. By means of these pipes *t* one or more jets of steam may be injected into the drying-chamber, above the floor B.

The presence of the steam in the air-current is of great importance in drying lumber properly, for, when hot air only is used, the lumber will become case-hardened, and will check on the surface, while, if a suitable quantity of steam is mingled with the hot air, the lumber is sufficiently softened to allow the moisture to escape from the interior, and thus become uniformly and thoroughly dry.

Above and below the pipes E are arranged joists or vertical partitions *w w*, those above the pipes alternating with those below, in the manner shown in Fig. 2, so as to cause the air in its passage from the front to the rear of the heating-chamber to pass alternately up and down, around, and between the pipes E, and become thoroughly heated before it enters the drying-chamber through the openings *e*.

Over and near the pipes E is a horizontal partition, *a'*, extending from near the front end of the heating-chamber backward as far as to the sheet-iron portion of the floor, for the purpose of confining the air to be heated close to the pipes. The space above said partition *a'* to the bottom B is inclosed, to form a dead-air chamber, I, as shown.

At the front end of the kiln is a flue or chimney, J, opening from the top of the drying-chamber and extending entirely across the kiln.

K is a fan-case, containing a suction-fan, L, driven by a belt or otherwise from the mill-engine, and said fan-case is connected by pipes *b' b'* with the interior of the drying-chamber, near the bottom of the front end, and also by the pipe *d'* with the chimney J.

A number of cars having been loaded with lumber and run into the drying-chamber, the doors C C are closed. The steam is injected through the pipes *t*, and the hot air passes up through the openings *e* into the drying-chamber. The moisture from the lumber and steam that is condensed settles to the bottom of the chamber, and is drawn out by the action of the fan through the pipes *b'*, and the lighter vapor and heated air escape directly by the chimney J. Through the action of the fan and the tendency of heated air to rise, a steady and continuous current is maintained through the drying-chamber.

As soon as the lumber on the rearmost car is sufficiently dried this car is taken out through the rear door of the kiln, the remaining cars are moved down, and another car introduced at the front end of the kiln. In this manner the operation of drying is carried on continuously.

H is a steam-trap, composed of an exterior cylinder, *f'*, having the cover *k'*, through the center of which passes the exhaust-tube *e'*. Inside the cylinder *f'* is a cup or bucket, *k'*, with central tube, *m'*, having holes *i'* at the sides, near the bottom. When the steam enters the trap through the pipe *n* it raises the bucket *k'* and closes the exhaust-pipe *e'*.

The water condensed in the cylinder *f'* from the admitted steam first fills the cylinder and then overflows into the bucket *k'*, which, when full, sinks and opens the exhaust-pipe *e'*, so that the entering steam forces out the water through said pipe. As soon as the bucket is sufficiently lightened by the outflow of water the steam again raises it and closes the exhaust-pipe, as before. By this means the pressure in the pipes E is kept uniform, and there is no liability of their bursting from an excess of pressure.

Having thus described my invention, I claim—

1. In a kiln for drying lumber, the inclined floor B, extending beyond the ends of the kiln to form the loading and unloading platform, and provided with openings *e* and sheet-metal part *f*, substantially as and for the purpose herein set forth.

2. The flexible self-adjusting car for lumber-driers herein described, consisting of two or more separable beams, each provided with wheels, substantially as and for the purpose herein set forth.

3. The flexible self-adjusting car for lumber-driers, herein described, consisting of the independent beams D', provided with wheels *i*, and connected by means of hooks *k*, substantially as and for the purpose herein set forth.

4. In combination with the inlet and exit pipes, the steam-chambers D, provided with the valves *p*, operated by means of the rod *s*, substantially as and for the purpose herein set forth.

5. In a hot-air lumber-drier, the combination, with the inclined car-track and heating-pipes located beneath the track, of a partition, *a'*, placed below the track-bed and proximate to the heating-pipes, for the purpose of confining the passing air close to the pipes, substantially as set forth.

6. In a hot-air lumber-drier, the combination, with the drying-chamber located above the floor B, and the heating-chambers located below said floor, of the dead-air chamber I, substantially as shown and described.

7. In a hot-air lumber-drier, the combination, with the inclined bottom B and steam-pipes E E, of the horizontal partition *a'* and the vertical partitions *w*, arranged alternately above and below the pipes, substantially as and for the purpose herein set forth.

8. The combination, in a hot-air lumber-drier, of the steam-chamber D, with valves *p* and pipes *t*, pipes E, steam-chamber G, and steam-trap H, all constructed substantially as and for the purpose herein set forth.

9. The combination of the kiln A, inclined bottom B, doors C C, steam-chambers D G, pipes E, trap H, wide chimney J, and suction-fan L, all constructed and arranged to operate substantially as and for the purpose herein set forth.

JOHN J. CURRAN.

Witnesses:
M. E. DAYTON,
JESSE COX, JR.